US011853399B2

(12) United States Patent
Yu et al.

(10) Patent No.: US 11,853,399 B2
(45) Date of Patent: *Dec. 26, 2023

(54) MULTIMODAL SENTIMENT CLASSIFICATION

(71) Applicant: Snap Inc., Santa Monica, CA (US)

(72) Inventors: Jianfei Yu, Los Angeles, CA (US); Luis Carlos Dos Santos Marujo, Culver City, CA (US); Venkata Satya Pradeep Karuturi, Marina del Rey, CA (US); Leonardo Ribas Machado das Neves, Marina Del Rey, CA (US); Ning Xu, Irvine, CA (US); William Brendel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,928

(22) Filed: Nov. 29, 2022

(65) Prior Publication Data

US 2023/0120887 A1  Apr. 20, 2023

Related U.S. Application Data

(63) Continuation of application No. 16/552,393, filed on Aug. 27, 2019, now Pat. No. 11,551,042.
(Continued)

(51) Int. Cl.
*G06F 40/30* (2020.01)
*G06F 18/2431* (2023.01)
*G06N 3/08* (2023.01)
*G06N 20/20* (2019.01)
*G06F 40/284* (2020.01)
(Continued)

(52) U.S. Cl.
CPC ........ *G06F 18/2431* (2023.01); *G06F 40/284* (2020.01); *G06F 40/30* (2020.01); *G06N 3/045* (2023.01); *G06N 3/08* (2013.01); *G06N 20/20* (2019.01); *G06F 40/279* (2020.01); *G06F 40/289* (2020.01); *G06F 40/295* (2020.01); *G10L 15/06* (2013.01);
(Continued)

(58) Field of Classification Search
None
See application file for complete search history.

(56) References Cited

U.S. PATENT DOCUMENTS 9,812,151 B1 * 11/2017 Amini .................... G06T 13/40
9,858,340 B1  1/2018 Frey et al.
(Continued)

OTHER PUBLICATIONS

U.S. Appl. No. 16/552,393, filed Aug. 27, 2019, Multimodal Sentiment Classification.
(Continued)

*Primary Examiner* — Richard Z Zhu
(74) *Attorney, Agent, or Firm* — Schwegman Lundberg & Woessner, P.A.

(57) ABSTRACT

Sentiment classification can be implemented by an entity-level multimodal sentiment classification neural network. The neural network can include left, right, and target entity subnetworks. The neural network can further include an image network that generates representation data that is combined and weighted with data output by the left, right, and target entity subnetworks to output a sentiment classification for an entity included in a network post.

20 Claims, 11 Drawing Sheets

Related U.S. Application Data

(60) Provisional application No. 62/723,412, filed on Aug. 27, 2018.

(51) Int. Cl.
*G06N 3/045* (2023.01)
*G10L 25/30* (2013.01)
*G06F 40/295* (2020.01)
*G06F 40/279* (2020.01)
*G06F 40/289* (2020.01)
*G10L 15/18* (2013.01)
*G10L 15/06* (2013.01)

(52) U.S. Cl.
CPC ...... *G10L 15/1807* (2013.01); *G10L 15/1815* (2013.01); *G10L 15/1822* (2013.01); *G10L 25/30* (2013.01)

(56) References Cited

U.S. PATENT DOCUMENTS

| | | | |
|---|---|---|---|
| 10,445,356 B1 | 10/2019 | Mugan et al. | |
| 10,788,900 B1* | 9/2020 | Brendel | G06F 40/53 |
| 11,200,269 B2 | 12/2021 | Ke et al. | |
| 11,200,506 B2* | 12/2021 | Wu | G06F 40/30 |
| 11,226,673 B2* | 1/2022 | Wang | G06F 40/30 |
| 11,299,269 B2* | 4/2022 | Rios | G05D 1/104 |
| 11,487,986 B2* | 11/2022 | Wu | G06N 5/02 |
| 2017/0178346 A1 | 6/2017 | Ferro et al. | |
| 2018/0248746 A1 | 8/2018 | Deluca et al. | |
| 2018/0336184 A1* | 11/2018 | Bellegarda | G06F 40/30 |
| 2018/0365773 A1 | 12/2018 | Han et al. | |
| 2019/0341050 A1 | 11/2019 | Diamant et al. | |
| 2020/0021873 A1 | 1/2020 | Swaminathan et al. | |
| 2020/0082928 A1 | 3/2020 | Wu et al. | |
| 2020/0154170 A1 | 5/2020 | Wu et al. | |
| 2020/0279279 A1 | 9/2020 | Chaudhuri | |
| 2020/0320116 A1* | 10/2020 | Wu | G06F 16/438 |
| 2020/0327327 A1* | 10/2020 | Wu | G06V 30/19173 |

OTHER PUBLICATIONS

"U.S. Appl. No. 16/552,393, Non Final Office Action dated Jun. 9, 2022", 11 pgs.

"U.S. Appl. No. 16/552,393, Notice of Allowance dated Aug. 25, 2022", 9 pgs.

"U.S. Appl. No. 16/552,393, Response filed Aug. 9, 2022 to Non Final Office Action dated Jun. 9, 2022", 8 pgs.

Gao, Yuze, et al., "Implicit Syntactic Features for Targeted Sentiment Analysis", Proceedings of the 8th International Joint Conference on Natural Language Processing, (Dec. 2017), 516-524.

Li, Hui, et al., "Towards End-to-end Text Spotting with Convolutional Recurrent Neural Networks", Machine Learning Group, The University of Adelaide, Australia, (Jul. 13, 2017), 14 pgs.

* cited by examiner

MULTIMODAL SENTIMENT CLASSIFICATION

CLAIM FOR PRIORITY

This application is a continuation of U.S. patent application Ser. No. 16/552,393, filed on Aug. 27, 2019, which claims the benefit of priority to U.S. Provisional Application Ser. No. 62/723,412, filed on Aug. 27, 2018, each of which are hereby incorporated by reference in their entireties.

TECHNICAL FIELD

Embodiments of the present disclosure relate generally to machine learning and, more particularly, but not by way of limitation, to multiple mode data classification.

BACKGROUND

Sentiment analysis of a network site user post involves attempting to determine the sentiment of the user that created a given network site user post of a subject or named entity discussed in the given network site user post. For example, in "Goal Machine! Luis Suarez picks up double award after hitting 40 in La Liga," the user appears to express a positive sentiment towards Luis Suarez (an athlete), and neutral sentiment towards La Liga (a sports league). Conventional sentiment analysis approaches attempt to perform sentiment analysis by using textual based processes. However, these conventional methods tend to be less effective when applied to some types of network site posts, such as a social media post comprising an image and a short caption, as such posts have limited text to analyze.

BRIEF DESCRIPTION OF THE DRAWINGS

To easily identify the discussion of any particular element or act, the most significant digit or digits in a reference number refer to the FIG. ("FIG.") number in which that element or act is first introduced.

DETAILED DESCRIPTION

Figure 1:
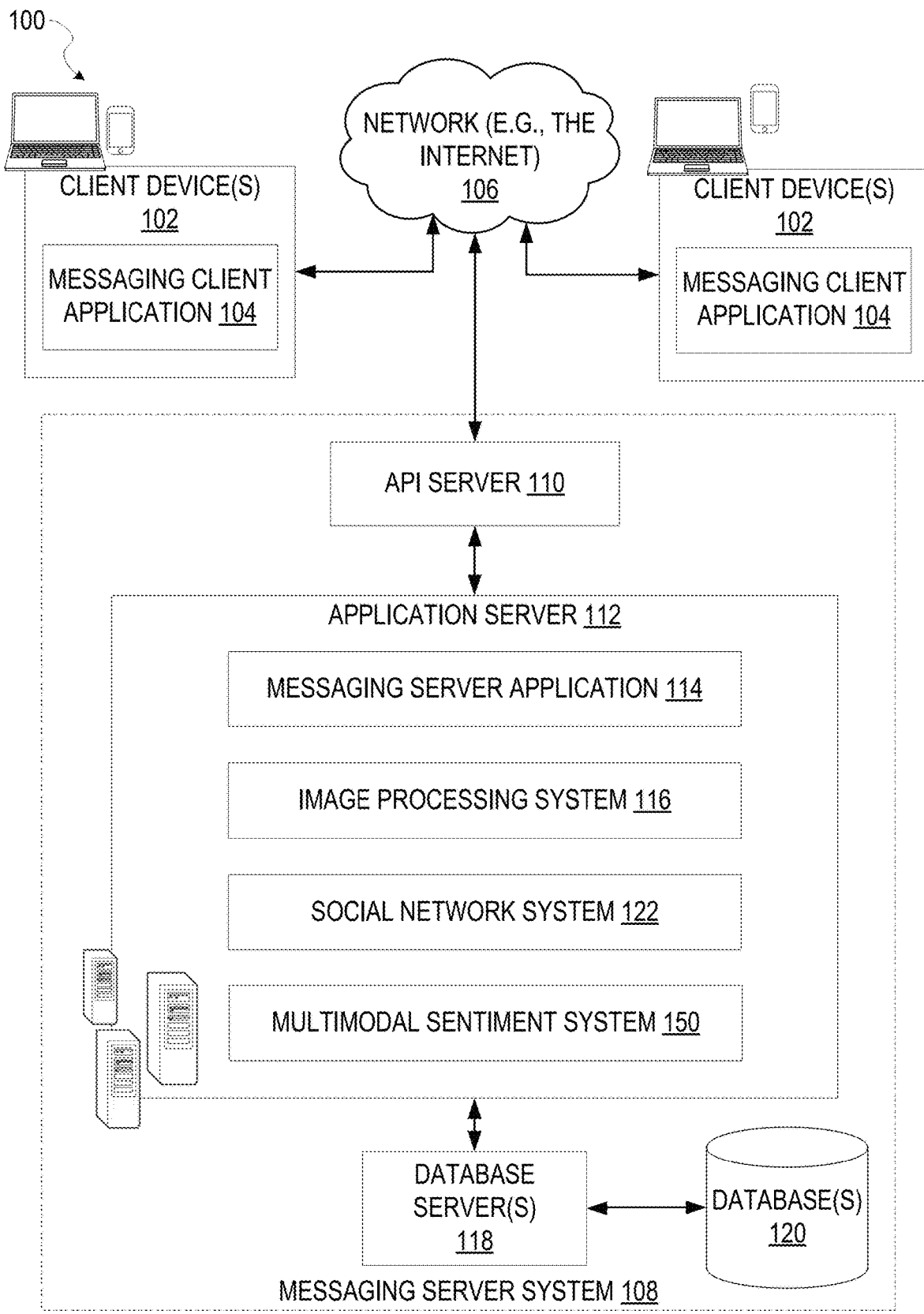
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, conventional sentiment analysis approaches can be ineffective in correctly classifying entity sentiments in some types of data, such as short-captioned image posts (e.g., social media post with an image or video accompanied with a short caption). These types of data often have sparse textual information and often the sentiment orientation towards an entity may largely rely on contextual information in the accompanying image. For example, in "I love Mozart," the entity Mozart may be initially deemed as neutral, but from an accompanying image of the user smiling holding a Mozart record album, the sentiment is then more correctly estimated as positive.

To this end, a multimodal sentiment system can be implemented to efficiently and more accurately generate entity-level sentiment classifications for multimodal messages, such as an image with a caption that includes words or symbols (e.g., emojis). In some example embodiments, the multimodal sentiment system implements multiple recurrent neural networks (e.g., long short term memory (LSTM) neural networks): one of which analyzes left textual context (e.g., text on a left side of a target entity in the caption), another of which analyzes a right context (e.g., text on a right side of the target entity in the caption), and another of which analyzes a target entity context (e.g., one or more terms of the named entity), to yield initial representations (e.g., vector data generated from word embeddings). In some example embodiments, the initial representations of the target entity context are further processed by the multimodal sentiment system by averaging the values of its hidden states, and the left and right contexts are further processed using an attention mechanism to capture the most important context information with respect to the target entity and the accompanying image.

In some example embodiments, the initial visual representation is generated by a residual network, and the multimodal sentiment system further implements an entity-oriented visual attention mechanism to extract valuable visual features that are closely related to the target entity, followed by incorporating a gate mechanism to eliminate noise stemming from an ambiguous or irrelevant visual context data. Further, the representations of the target entity, the left and right contexts and the visual context are concatenated as the final representation of the multimodal message, which is then classified to generate a sentiment prediction (e.g., positive sentiment likelihood=0.75, neutral sentiment likelihood=0.20, etc.), according to some example embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). In various embodiments, virtual machine learning can be used by messaging client application 104 and/or image processing system 116 to analyze images sent within the messaging system 100 and to use this analysis to provide features within the messaging system 100.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, include functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, image search, social network information, and live event information, as examples, some of which rely on information generated by analyzing images sent through the messaging system 100. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112. In some embodiments, databases 120 may also store results of image processing or details of various trained and untrained support vector machines that may be used by messaging server system 108.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the addition and deletion of friends to and from a social graph; the location of friends within the social graph; and application events (e.g., relating to the messaging client application 104).

The application server 112 hosts a number of applications and subsystems, including the messaging server application 114, an image processing system 116, a social network system 122, and a multimodal sentiment system 150, according to some example embodiments. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The multimodal sentiment system 150 comprises one or more functional engines that manage entity-level multimodal sentiment classification for multimodal posts, such as posts published to the social network system 122. Further details of the functional engines of the multimodal modal system 150 are discussed below with reference to FIG. 2 and FIG. 6.

The application server 112 is communicatively coupled to a database server 118, which facilitates access to a database 120 in which is stored data associated with messages processed by the messaging server application 114.

Figure 2:
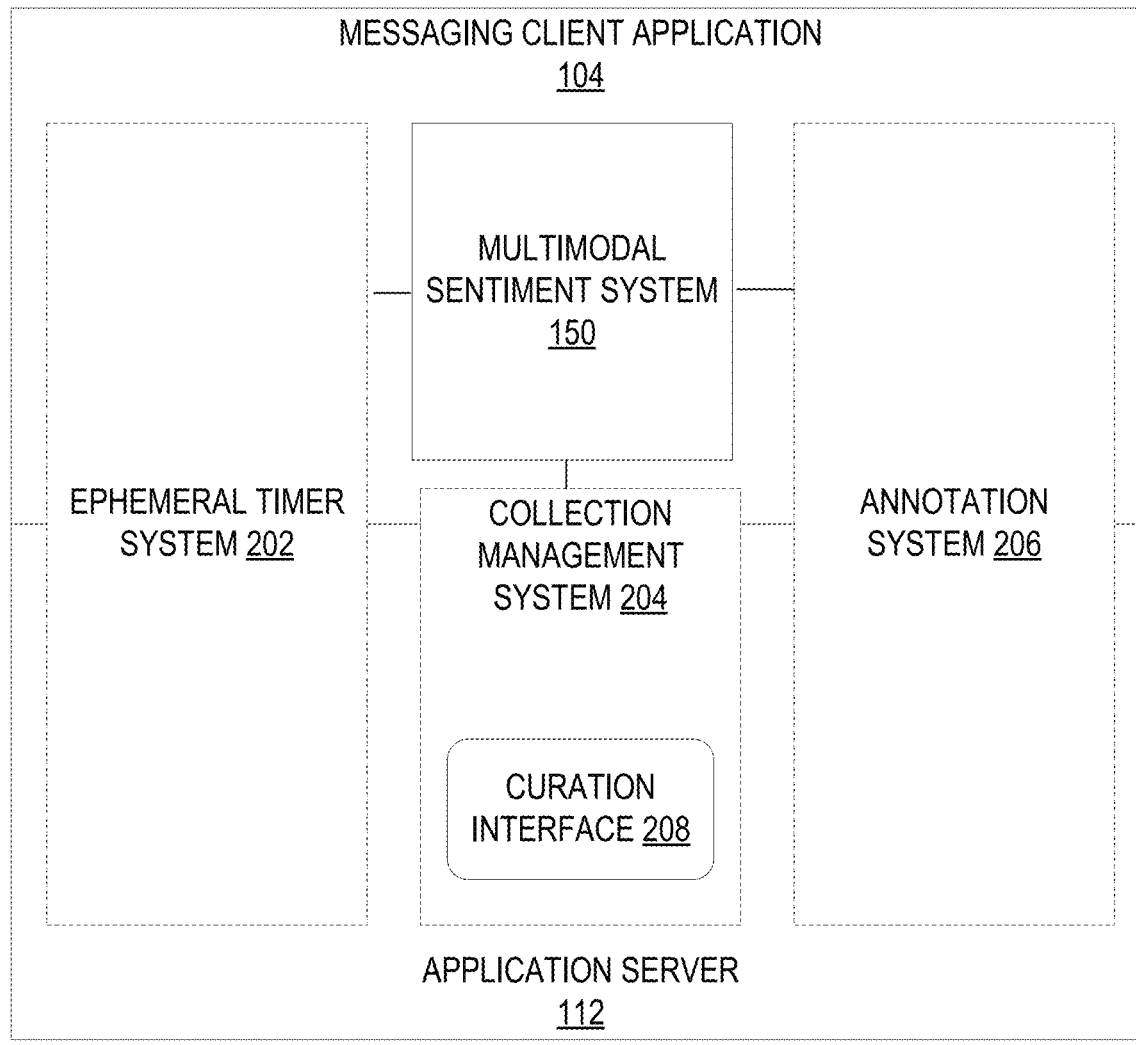
FIG. 2 is a block diagram illustrating further details regarding the messaging system of FIG. 1, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a multimodal sentiment system 150. In some example embodiments, e.g., in which the multimodal sentiment system 150 is implemented on a client device 102, one or more engines of the multimodal system 150 are omitted or run purely from the server-side. For example, the training engine 610 discussed below is implemented solely on the server-side (e.g., on application server 112) and the server-side training engine 610 is implemented to train a neural network model on training data, and the trained model is then distributed to instances of the multimodal system 150, which implement the trained model using the neural engine 615.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

Figure 3:
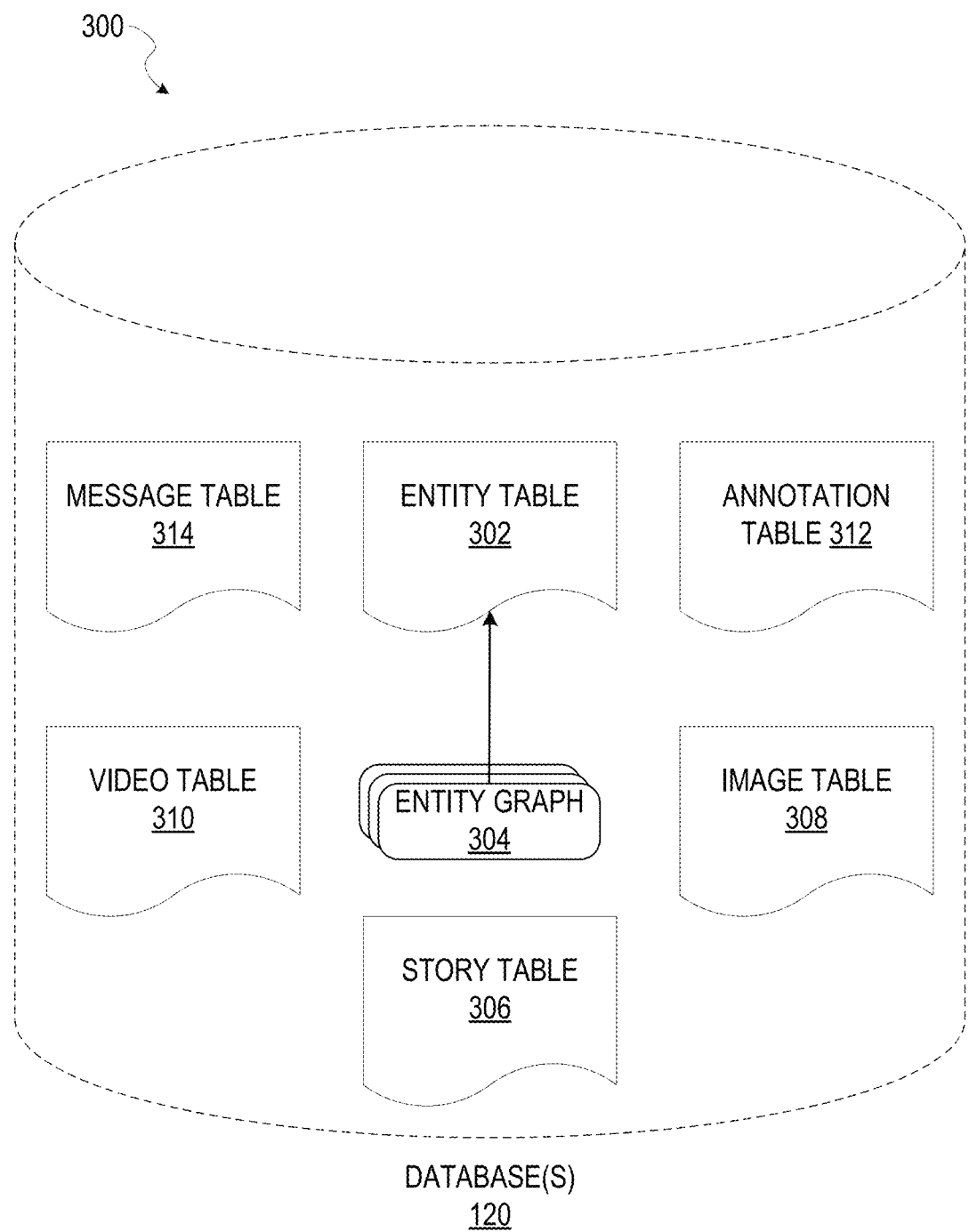
FIG. 3 is a schematic diagram illustrating data that may be stored in a database of a messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time FIG. 3 is a schematic diagram illustrating data 300, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Merely for example, such relationships may be social, professional (e.g., work at a common corporation or organization), interested-based, or activity-based.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
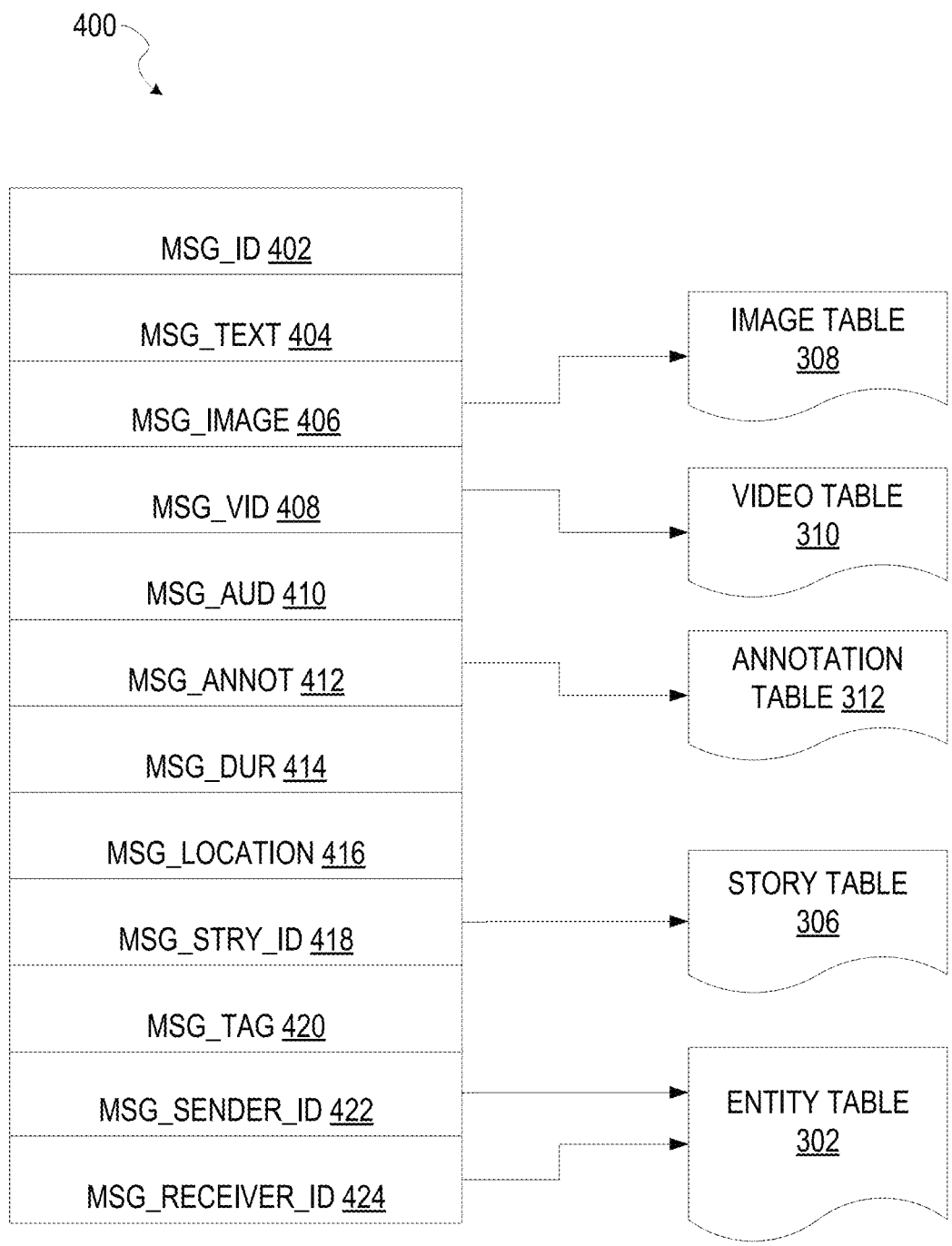
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102, and that is included in the message 400.

A message audio payload 410: audio data, captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
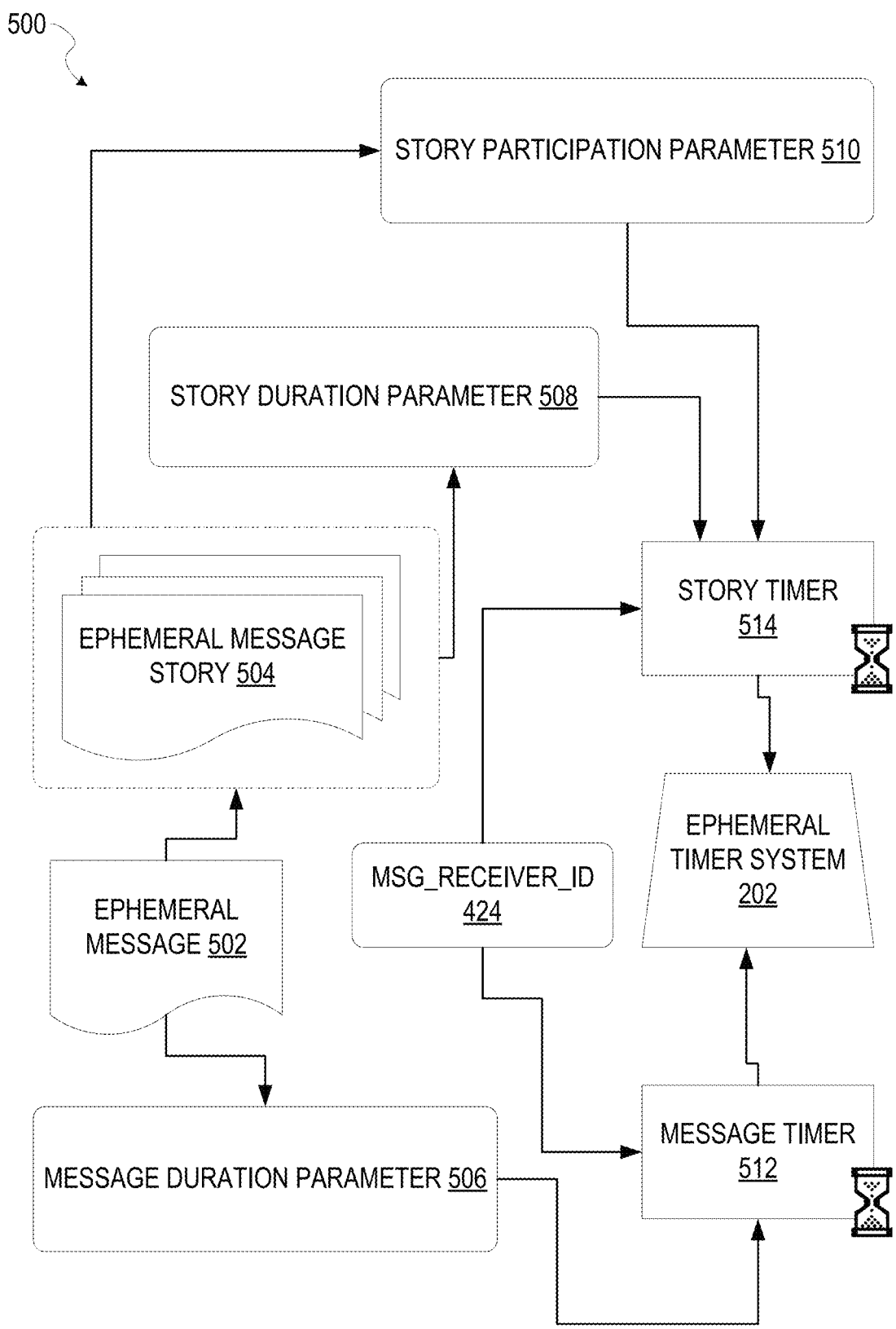
FIG. 5 is a schematic diagram illustrating an example access-limiting process, in terms of which access to content (e.g., an ephemeral message and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
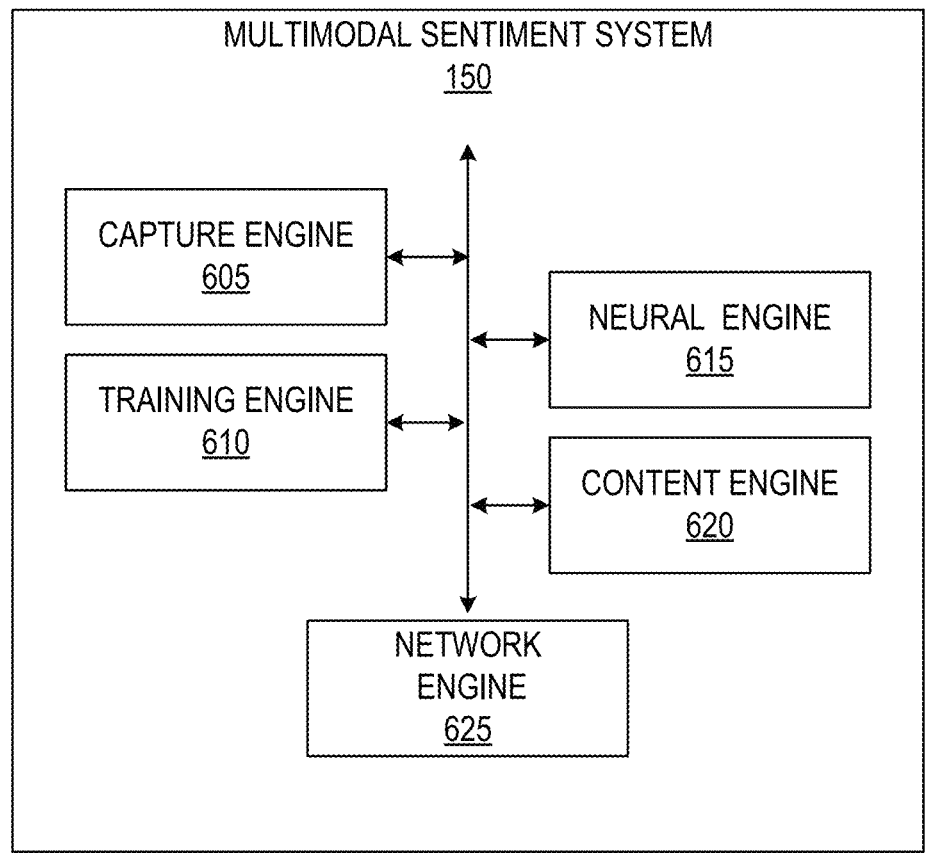
FIG. 6 illustrates functional engines of a multimodal sentiment system, according to some example embodiments.

FIG. 6 illustrates functional engines of a multimodal sentiment system 150, according to some example embodiments. As illustrated, the system 150 comprises a capture engine 605, a training engine 610, a neural engine 615, a content engine 620, and a network engine 625. The capture engine 605 is configured to generate multimodal message data, such as an image or video that can be annotated with a text caption or additional imagery (e.g., pictorial symbols, emojis). The training engine 610 is configured to train an entity-level sentiment prediction multimodal neural network on training data. In some example embodiments, the training data includes a plurality of multimodal messages. Each of the multimodal messages in the plurality can comprise an image and a text caption, according to some example embodiments. The text caption can include one or more named entities that may or may not be depicted in a given image of a multimodal message. In some example embodiments, each of the multimodal messages in the training data set are pre-labeled (e.g., by human users) to indicate which of the terms in the captions are named entities.

The neural engine 615 is configured to receive multimodal message data generated by the capture engine 605 and generate a sentiment classification that describes the sentiment of the user that generated the multimodal message towards an entity named in the caption (e.g., a positive sentiment, a negative sentiment, a neutral sentiment towards an entity discussed and/or depicted in the multimodal message). The content engine 620 is configured to perform subsequent actions using the generated sentiment classification. For example, according to some example embodiments, the content engine 620 determines that the user of a multimodal message has a positive sentiment towards an entity in the multimodal message, and thus suggests one or more items of content (e.g., emojis) for display to the user (e.g., a heart emoji, smiley face, an animated cartoon for overlay, etc.). In some example embodiments, the content engine 620 is configured to identify trends (e.g., positive associations, negative associations) that are occurring between named entities mentioned in a plurality of multimodal messages. The network engine 625 is configured to publish the multimodal message captured by the capture engine 605 and/or modified by the content engine 620 to a network site, such as a social network site of social network system 122.

Figure 7:
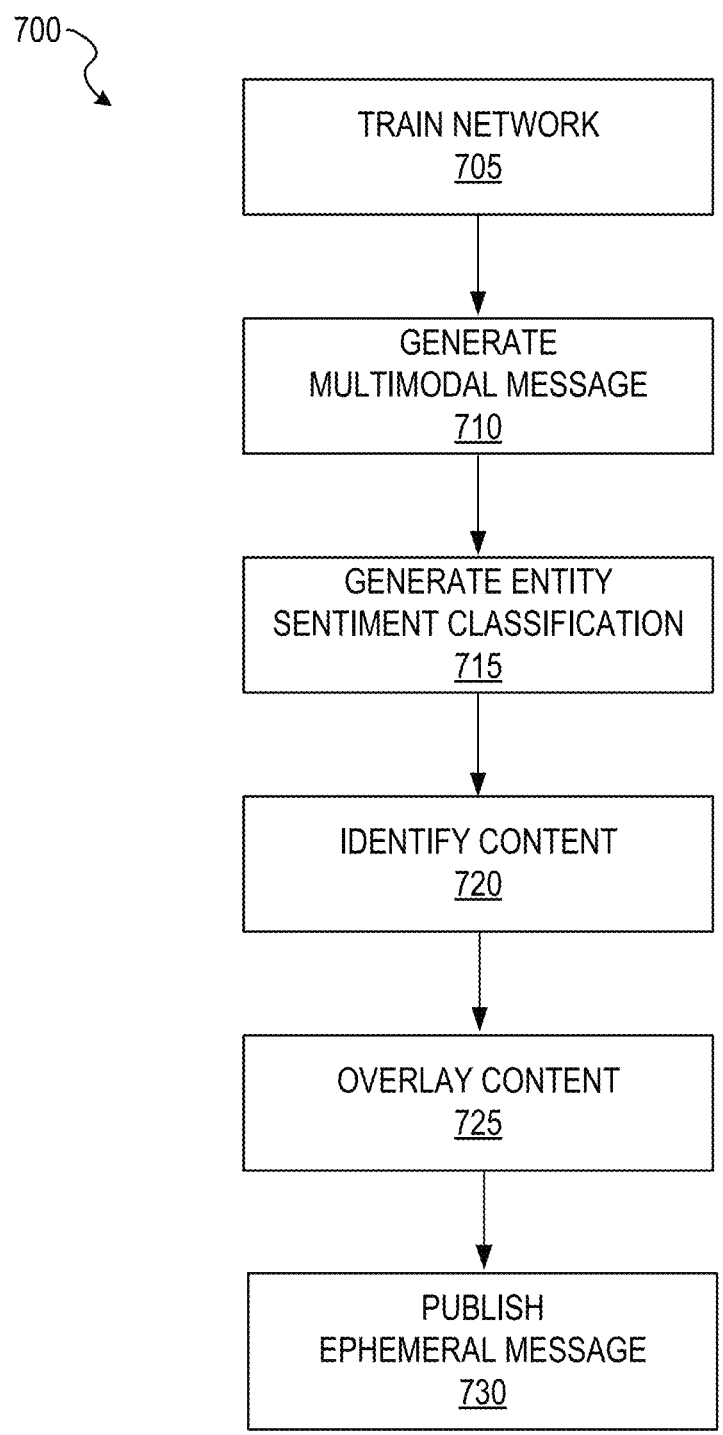
FIG. 7 shows a flow diagram of a method for performing multimodal sentiment classification, according to some example embodiments.

FIG. 7 shows a flow diagram of a method 700 for performing multimodal sentiment classification, according to some example embodiments. In the example of FIG. 7, the entity based multimodal sentiment system 150 is configured to identify a sentiment and use the sentiment to identify pre-associated (e.g., pre-linked) content for overlay or inclusion in a multimodal message social media post. At operation 705, the training engine 610 trains a multimodal sentiment classification neural network on training data, such as a plurality of multimodal messages stored in database 120 (via a server-side training engine 610). Further training details are discussed below with reference to FIG. 8.

At operation 710, the capture engine 605 generates a multimodal message on the client device. For example, at operation 710, the capture engine 605 generates an image or video using an image sensor of the client device, while simultaneously recording audio using an audio sensor (e.g., microphone) of the client device. After the image or video is generated, the capture engine 605 receives one or more text items from the user of the client device as an annotation or caption (e.g., text words, characters, punctuation marks, pictorial symbols, emojis).

At operation 715, the neural engine 615 applies trained compound neural network on the multimodal message to determine whether the user the generated multimodal message has a positive sentiment, a negative sentiment, or a neutral sentiment towards a named entity described in the multimodal message. Further details of the compound neural network is discussed in further detail below with reference to FIG. 8. In some example embodiments, the trained compound neural network outputs data from a classification layer (e.g., implementing a SoftMax function), where the output data indicates a likelihood or probability for each trained sentiment. For example, the classification layer may output a 90% likelihood that the user feels a positive sentiment towards an entity in the post, and further output a 20% neutral likelihood, and a 5% negative likelihood.

At operation 720, the content engine 620 identifies content associated with the sentiment classification generated at operation 715. For example, if the sentiment classification generated at operation 715 indicates that the user feels a positive sentiment towards an entity named in the multimodal message (e.g., as indicated by the highest probability being the 90% likelihood for positive sentiment), then at operation 720, positive sentiment user interface content (e.g., a smiley emoji) is displayed as a suggestion for content to include in a social media post (e.g., overlay content, additional emojis to include in the caption, etc.).

At operation 725, the content engine 620 includes the identified content in the multimodal message. At operation 730, the network engine 625 publishes the modified multimodal message with the suggested content as an ephemeral message to a network site, such as a social media site, for access and display to other users of the messaging client application 104.

Figure 8:
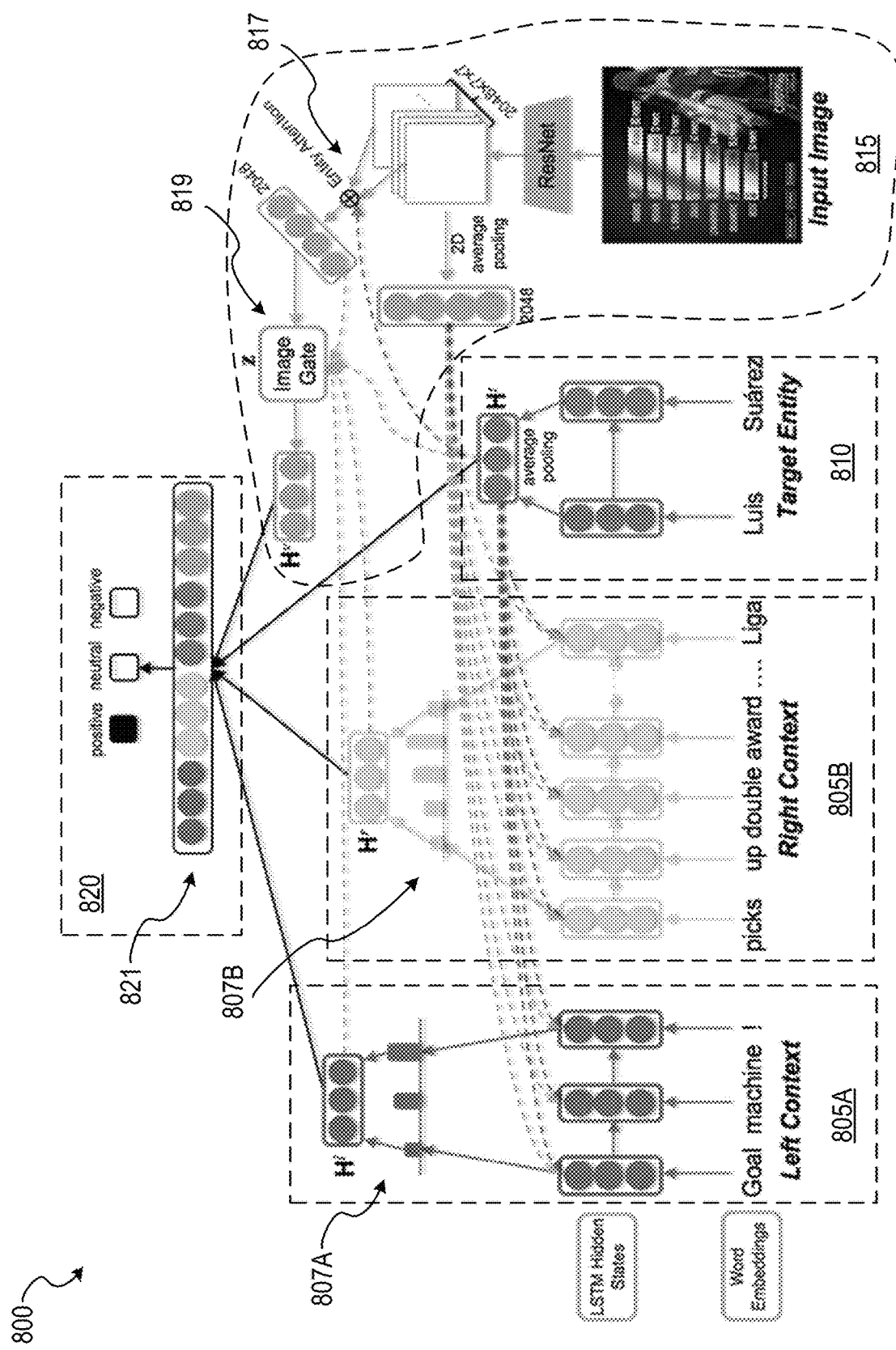
FIG. 8 shows an example neural network architecture for performing entity-level multimodal sentiment classification, according to some example embodiments.

FIG. 8 shows an example model architecture 800 of the entity based multimodal sentiment neural network, according to some example embodiments. The example model architecture 800 is of a multi-part neural network, where different subnetworks are integrated and trained end-to-end (e.g., via backpropagation) at operation 705 and after training is implemented at operation 715 of method 700 to generate sentiment data, according to some example embodiments.

Analytically, given a sentence S with it words ($w_1$, $w_2, \ldots, w_n$) and a target entity T (a sub-sequence of words in S) as well as its accompanying image V as inputs, the goal is configured as a prediction of the sentiment orientation y over the target entity T, where y is assumed to be either positive, negative or neutral.

Textual Input data: the caption of a given multimodal message is denoted as the input sentence S, which is split as follows: let $s_{\bar{l}}=(x_1^l, x_2^l, \ldots, x_L^l)$, $s_r=(x_1^r, x_2^r, \ldots, x_R^r)$, and $t=(x_1^t, x_2^t, \ldots, x_C^t)$ to denote the left context, the right context, and the target entity respectively, where $x_i$ is a d-dimensional word vector looked up from a word embedding matrix $E \in \mathbb{R}^{d \times |V|}$ with a vocabulary size of $|V|$, and where L, R, and C are the input lengths of each component. In some example embodiments, the input sentence is first input into a named entity recognition layer (not depicted in FIG. 8 for brevity) to identify which of words correspond to a named entity. For example, the named entity recognition layer identifies Luis Suarez as the named entity for processing by the target entity subnetwork 810, then stores the words to the left of the identified entity as the left textual context data for processing by the left context subnetwork 805A, and further stores the words to the right of the identified entity as the right contextual data for processing by right context subnetwork 805B.

Visual input data in visual context subnetwork 815: The convolutional neural network (CNN) model in the illustrated example embodiment is a Residual Network (ResNet), which is configured to extract visual features of different regions of an image. Specifically, the input image V is first resized to 224×224 pixels to yield V', which is then input into a 152-layer ResNet. The regional feature representation is obtained as follows:

$$R = ResNet(V')$$

where R is a tensor with a dimension of 2048×7×7, where 7×7 refers to the number of 32×32 pixel regions in V', and 2048 refers to the dimension of the feature vector for each 32×32 pixel region, according to some example embodiments. In the training data set, manually labeled data is denoted by $D=\{(s), s_l^{(j)}, s_r^{(j)}, t^{(j)}, R^{(j)}), y^{(j)}\}_{j=1}^{N}$.

In the target entity subnetwork 810, an LSTM network is implemented to obtain the hidden state for each word (e.g., for each word embedding) in the terms of the target entity, followed by an average pooling operation to obtain a target entity final representation ($H^T$).

Similarly, in left and right subnetworks 805A and 805B, an additional two LSTMs are used to generate the hidden state for each word (e.g., word embedding) in both the left and the right contexts parts. Vector data output from the target entity subnetwork 810 and the visual context subnetwork 815 are combined with the text data, which is then input into attention layer 807A and attention layer 807B, that are configured weight each word being evaluated in the left context subnetwork 805A and the right context subnetwork 805B with respect to the target entity data and the visual context data. The weighted sums of the left and right context words are the final representations of the left context ($H^l$) and the right context ($H^r$), respectively.

In the visual context subnetwork 815, after generating the regional feature vectors from the ResNet, the visual attention network 817 receives target entity data from the average pooling of the target entity subnetwork 810 (e.g., $H^T$), and the visual attention network 817 then computes attention weights for each image region based on their relatedness with the target entity data. On top of the generated visual attention vectors, an image gate 819 is configured to dynamically control the contribution of the visual information, since in some cases the accompanying image might be noisy or irrelevant to the textual contents. In the classification layer 820 each contextual data set from each of the left context subnetwork 805A and right context subnetwork 805B, the target entity subnetwork 810, and visual context subnetwork 815 is concatenated and the input into a Soft-Max layer to generate a sentiment classification entity level prediction, e.g., positive, neutral, negative.

In the following subsections, learning the representations for the three contexts are described in further technical detail.

Target Entity Representation (TER) in target entity subnetwork 810: As mentioned above, an LSTM network is implemented to sequentially read all the words in the input target entity to form the hidden state $h_i^t$ for each word $x_i^t$:

$$h_i^t = LSTM_\Theta(h_{i-1}^t, x_i^t), i \in [1, C]$$

where $h_i^t \in \mathbb{R}^h$, and $\Theta$ represents all the parameters in the LSTM. After generating the hidden states of all the words in the target entity $[h_1^t, h_2^t, \ldots, h_C^t]$, the average value of the hidden states is then the final representation of the target entity:

$$H^t = \sum_{i=1}^{C} \frac{1}{C} h_i^t$$

Textual Context Representation (TCR) in the left context subnetwork 805A and the right context subnetwork 805B: To better capture the semantic meanings and the long-range word dependencies of the left contexts and the right contexts, an LSTM in the left context subnetwork 805A generates h-dimensional left hidden states: $[h_1^l, h_2^l, \ldots, h_L^l]$ and another LSTM in the right context subnetwork 805B generates h-dimensional right hidden states: $[h_1^r, h_2^r, \ldots, h_R^r]$.

Based on these hidden states, the respective attention mechanisms 807A and 807B learn the semantic representations of the left and right contexts. Intuitively, given different target entities and accompany images, the importance of each context word can be different. For example, given the target entity "Luis Suarez" in a caption, together with an accompanying image depicting Luis Suarez, the context words "Goal machine" and "double award" tend to receive more attention; whereas given the target entity "La Liga" and the same image, the preposition word "in" tend to receive more attention. In this way, the architecture 800 is configured to learn to compute the attention weights of context words with respect to the target entity and the image context.

According to some example embodiments, a global image representation is first generated, which encodes the general properties about the input image (e.g., specific objects contained in the image, such as player, musician, and stadium, etc.). Then 2D-average pooling is applied to obtain the global image representation as below:

$$g = AvgPool2d(R)$$

where the kernel size and the stride of the 2D-average pooling operation are set to be 7 and 1 respectively, and g is a 2048-dimensional feature vector, according to some example embodiments. Furthermore, since the dimension of g is inconsistent with the dimension of the hidden states in LSTM, it is converted using a non-linear transformation function:

$$G^v = \tanh(W_g g + b_g)$$

where $W_g \in \mathbb{R}^{d \times 2048}$ and $b_g \in \mathbb{R}^d$ are learnable weight matrix and bias.

With the target entity representation $H^t$ and the transformed global image representation $G^v$ as inputs, the attention networks 807A and 807B compute the attention weights for each hidden state in the left context based on their bilinear interactions with $H^t$ and $G^v$:

$$u_i^l = \tanh(h_i^l \cdot W_H^l \cdot H^t + h_i^l \cdot W_G^l \cdot G^v + b^l)$$

$$\alpha_i^l = \frac{\exp(u_i^l)}{\sum_{j=1}^{L} \exp(u_j^l)},$$

where $W_H^l, W_G^l \in \mathbb{R}^{d \times d}$ and $b^l \in \mathbb{R}$ are learnable parameters. The final representation of the left context (as an example) can be derived as follows:

$$H^l = \sum_{i=1}^{L} \alpha_i^l h_i^l$$

Visual Context Representation (VCR): As mentioned above, only modeling the target entity representation (TER) and the textual context representation (TCR) may be still insufficient to generate correct sentiment predictions, especially for social media posts where the textual context is limited, incomplete, or intentionally vague (e.g., a post in which the meaning of a short intentionally vague caption is elucidated by the accompanying image). Further, in some cases, only parts of the image are related, and other parts should be ignored or emphasized. For instance, if the caption mentions Luis Suarez and the image is of a team roster with many other player names depicted, the regions depicting the other players' names should be de-emphasized and the region of the image depicting Luis Suarez's name should be emphasized. To this end, the visual attention network 817 (entity attention network) is implemented on top of the regional feature representation R, which helps the model focus on the regions that are closely relevant to the target entity. Specifically, the system first represents the 2048×7× 7-dimensional tensor R in the following form:

$$R = \{r_w | r_w \in \mathbb{R}^{2048}, w=1,2,\ldots,49\}$$

where $r_w$ is the feature representation of each region. Then, the attention weights are calculated for each region as below:

$$u_w^v = q^\top \tanh(W_H^v H^t + W_R^v r_w + b^v)$$

$$\alpha_w^v = \frac{\exp(u_w^v)}{\sum_{j=1}^{49} \exp(u_j^v)}$$

where $W_H^v \in \mathbb{R}^{d \times d}$, $W_R^v \in \mathbb{R}^{d \times 2048}$, $q \in \mathbb{R}^d$ and $b^v \in \mathbb{R}^d$ are learnable parameters. Based on these visual attention weights, the visual contextual representation with the weighted sum of all regions is generated as follows:

$$r^v = \sum_{w=1}^{49} \alpha_w^v r_w$$

where $r^v$ is a 2048-dimensional image feature vector. Next, to be consistent with the dimension of the TER data in the target entity subnetwork 810 and TCR data from left context subnetwork 805A and right context subnetwork 805B, we use a non-linear function to transform $r^v$ to a d-dimensional vector:

$$Q^v = \tanh(W_v r^v + b_v)$$

where $W_v \in \mathbb{R}^{d \times 2048}$ and $b_v \in \mathbb{R}^d$ are learnable parameters.

The visual data from the image can introduce noise in the prediction model for different reasons. First, in some multimodal social media posts, the input image may be only useful for inferring the sentiment of one or two target entities, but useless for the other target entities. Second, in some cases, the input image may be less relevant or even irrelevant to the textual context, and should be largely ignored by our model.

To this end, the image gate 819 is configured to dynamically eliminate the noise from an accompanying image by combining the information from the target entity data, left/right textual context data and visual ResNet generated data as follows:

$$z = \sigma(W^t H^t + W^l H^l + W^r H^r + W^v r^v + b^z)$$

where $W^t$, $W^l$, $W^r \in \mathbb{R}^{d \times d}$, $Wv \in \mathbb{R}^{d \times 2048}$ and $b^z \in \mathbb{R}^d$ are learnable parameters, and $\sigma$ is the element-wise sigmoid function. The final visual context representation can be obtained as below:

$$H^v = z \cdot Q^v$$

Model Training: In the classification layer 820, the representations learned for the three components (the target entity, the left and right contexts, as well as the visual context) are concatenated to yield the complete representation 821, which is represented as follows:

$$H = H^t \oplus H^l \oplus H^r \oplus H^v$$

The classification layer inputs the complete representation to a SoftMax function for entity-level sentiment classification:

$$p(y|H) = \text{softmax}(W \cdot H + b)$$

where $W \in \mathbb{R}^{4d \times 3}$ and $b \in \mathbb{R}^3$ are learnable parameters. To optimize all the parameters in the method, the learning objective is configured to minimize the following function with the standard cross-entropy loss:

$$\mathcal{J} = -\frac{1}{N} \sum_{j=1}^{N} \log p(y^{(j)} | H^{(j)})$$

Figure 9:
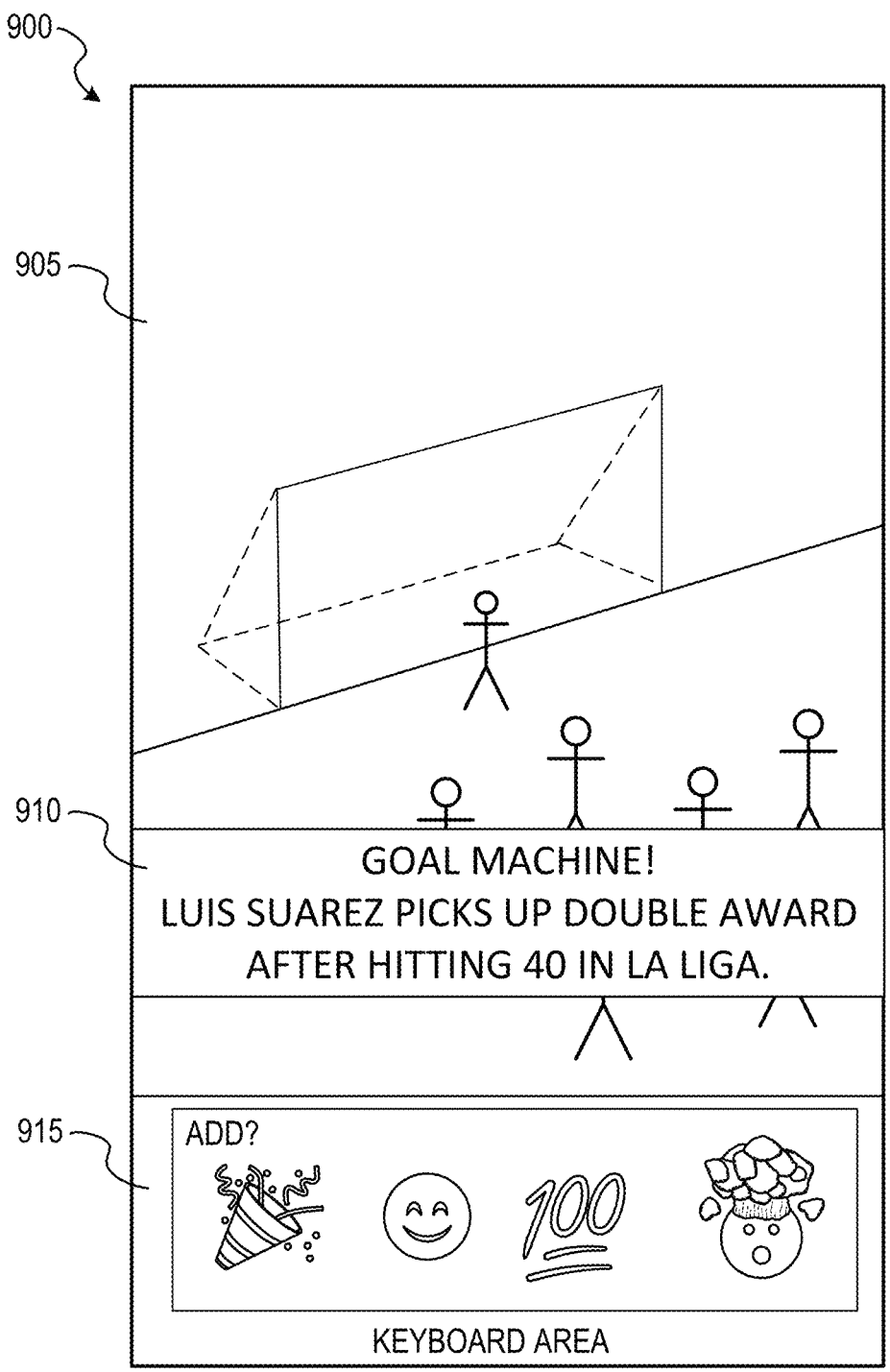
FIG. 9 shows an example user interface for multimodal sentiment classification, according to some example embodiments.

FIG. 9 shows an example user interface 900 generated by implementing the multimodal sentiment system 150 on a client device 102 (via message client application 104), according to some example embodiments. The user interface 900 comprises an image 905 generated by the client device 102 (e.g., via a backside image sensor). The image has been annotated by the client device user with a caption 910. The multimodal sentiment system 150 identifies the image 905 and the caption 910 and implements architecture 800 to generate classifications that describe whether a user (e.g., the user that generated image 905 and caption 910) has a positive sentiment, a negative sentiment, or a neutral sentiment towards entities in the caption 910. In the example of FIG. 9, in response to determining that the user has a positive sentiment towards an entity named in caption 910 (e.g., Luis Suarez), the multimodal sentiment system 150 generates suggested content 915 (e.g., positive emojis) for inclusion in the caption 910. After the user selects or adds one or more items of the suggested content 915, the image 905 and the modified caption 910 can be published as a modified multimodal message on a network site, e.g., to social network system 122 on application server 112.

Figure 10:
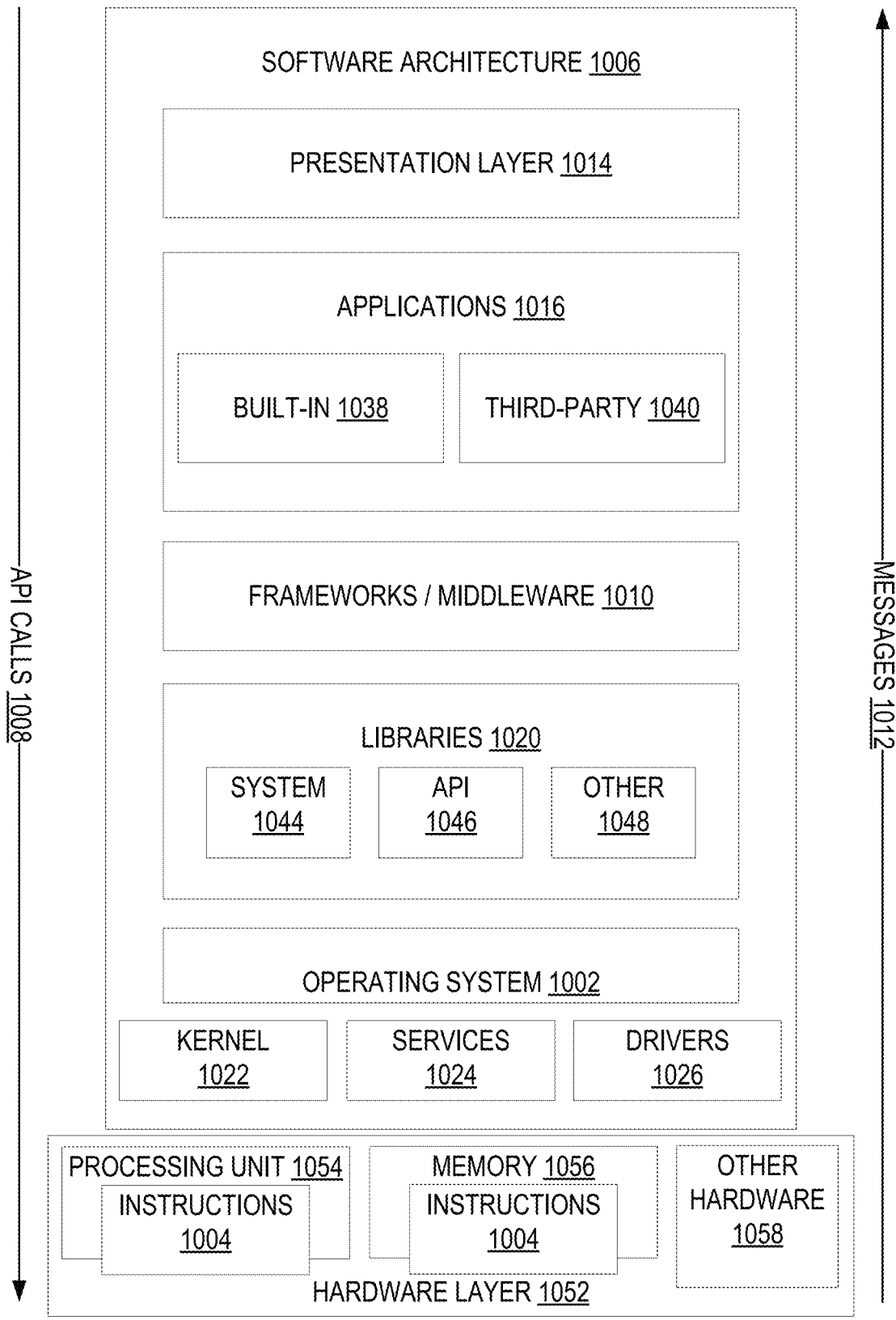
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture, and it will be appreciated that many other architectures may be implemented to facilitate the functionality described herein. The software architecture 1006 may execute on hardware such as a machine 1100 of FIG. 11 that includes, among other things, processors 1110, memory 1132, and I/O components 1150. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage modules 1056, which also have the executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1010, applications 1016, and a presentation layer 1014. Operationally, the applications 1016 and/or other components within the layers may invoke API calls 1008 through the software stack and receive a response in the form of messages 1012. The layers illustrated are representative in nature and not all software architectures have all layers. For example, some mobile or special-purpose operating systems may not provide a frameworks/middleware 1010, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1010 provide a higher-level common infrastructure that may be used by the applications 1016 and/or other software components/modules. For example, the frameworks/middleware 1010 may provide various graphic user interface (GUI) functions, high-level resource management, high-level location services, and so forth. The frameworks/middleware 1010 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1010 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Figure 11:
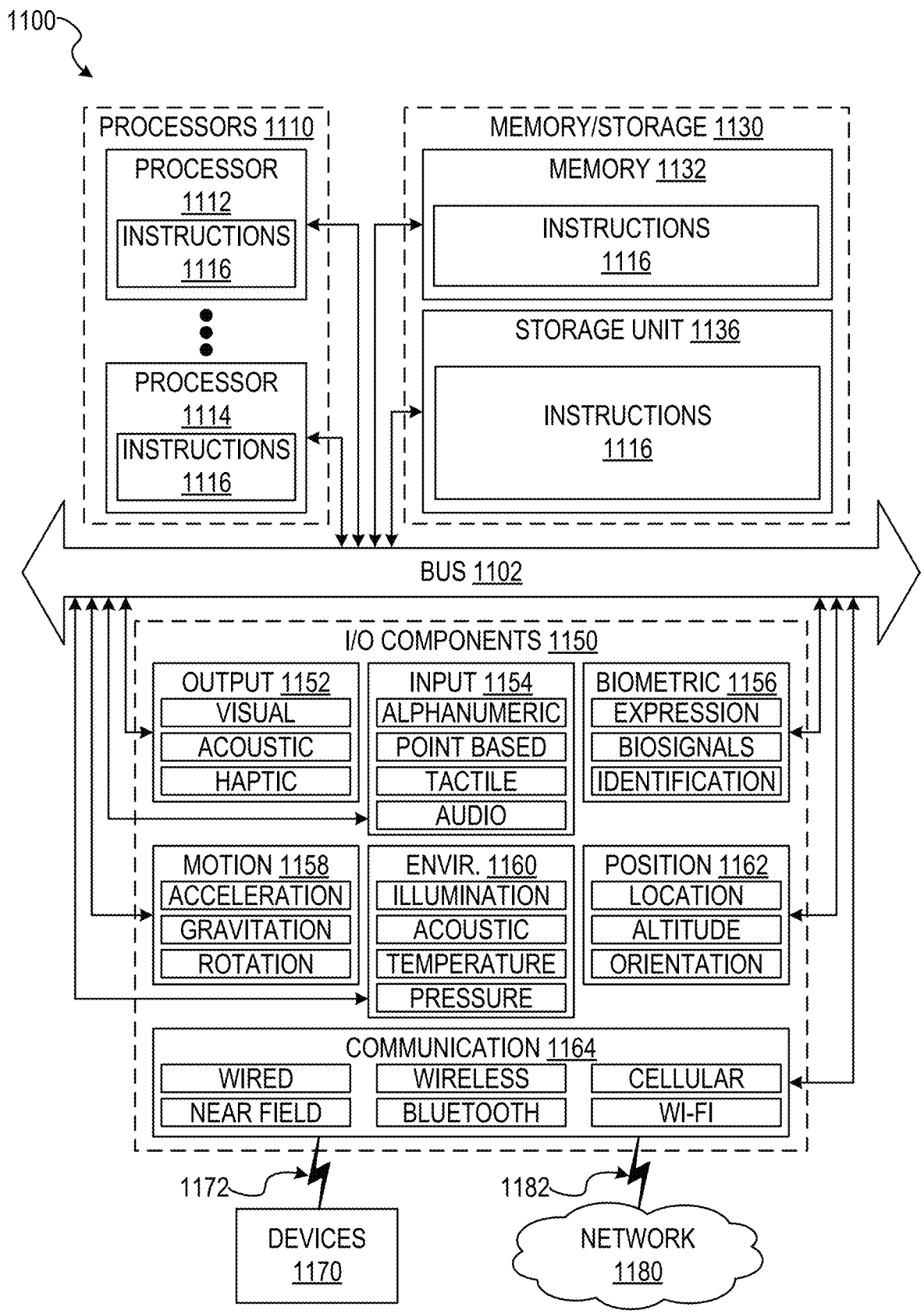
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. As such, the instructions 1116 may be used to implement modules or components described herein. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines that individually or jointly execute the instructions 1116 to perform any one or more of the methodologies discussed herein.

The machine 1100 may include processors 1110 having individual processors 1112 and 1114 (e.g., cores), memory/ storage 1130, and I/O components 1150, which may be configured to communicate with each other such as via a bus 1102. The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

The I/O components 1150 may include a wide variety of components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environment components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environment components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or other suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF411, Ultra Code, UCC RSS-2D barcode, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components.

Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   identifying a multimodal message comprising an image and a plurality of terms, the plurality of terms comprising an entity term and non-entity terms;
   generating, using a convolutional neural network (CNN), an image representation from the image in the multimodal message;
   generating, using a first recurrent neural network, a left representation from terms to the left of the entity term;
   generating, using a second recurrent neural network, a target entity representation from the entity term;
   generating, using a third recurrent neural network, a right representation from terms to the right of the entity term; and
   generating a sentiment classification by combining the image representation, the left representation, the target entity representation, and the right representation.

2. The method of claim 1, further comprising:
   generating a merged representation by merging the target entity representation, the left representation, the right representation, and the image representation,
   wherein the sentiment classification is generated by applying a classification layer to the merged representation.

3. The method of claim 2, wherein the sentiment classification is one or more of the following: a positive sentiment, a negative sentiment, or neutral sentiment.

4. The method of claim 1, further comprising:
   generating the image using an image sensor of a user device.

5. The method of claim 4, further comprising:
   identifying content data using the generated sentiment classification; and
   displaying the content data on the user device.

6. The method of claim 5, further comprising:
   generating a modified multimodal message from the content data and the multimodal message; and publishing, to a network site, the modified multimodal message as an ephemeral message.

7. The method of claim 1, wherein the combined left and right representations are linearly combined and weighted to emphasize significant characters.

8. The method of claim 1, wherein the image representation is weighted to emphasize regions within the image that are more related to the one or more entity terms.

9. The method of claim 2, wherein the merging is concatenation.

10. The method of claim 1, wherein the first recurrent neural network, the second recurrent neural network, the third recurrent neural network, and the convolutional neural network are subnetworks of a network trained end-to-end on a training dataset,
    wherein the training dataset comprises a plurality of multimodal messages, each of the multimodal messages comprising an image and one or more terms corresponding to an entity.

11. A system comprising:
    one or more processors of a machine; and
    a memory storing instructions that, when executed by at least one processor among the one or more processors, causes the machine to perform operations comprising:

identifying a multimodal message comprising an image and a plurality of terms, the plurality of terms comprising an entity term and non-entity terms;

generating, using a convolutional neural network (CNN), an image representation from the image in the multimodal message;

generating, using a first recurrent neural network, a left representation from terms to the left of the entity term;

generating, using a second recurrent neural network, a target entity representation from the entity term;

generating, using a third recurrent neural network, a right representation from terms to the right of the entity term; and generating a sentiment classification by combining the image representation, the left representation, the target entity representation, and the right representation.

12. The system of claim 11, wherein the operations further comprise:

generating a merged representation by merging the target entity representation, the left representation, the right representation, and the image representation, wherein the sentiment classification is generated by applying a classification layer to the merged representation, wherein the merging is concatenation.

13. The system of claim 12, wherein the sentiment classification is one or more of the following: a positive sentiment, a negative sentiment, or neutral sentiment.

14. The system of claim 11, wherein the operations further comprise:

generating the image using an image sensor of a user device.

15. The system of claim 14, wherein the operations further comprise:

identifying content data using the generated sentiment classification; and displaying the content data on the user device.

16. The system of claim 15, wherein the operations further comprise:

generating a modified multimodal message from the content data and the multimodal message; and publishing, to a network site, the modified multimodal message as an ephemeral message.

17. The system of claim 11, wherein the linearly combined left and right representations are weighted to emphasize significant characters.

18. The system of claim 11, wherein the image representation is weighted to emphasize regions within the image that are more related to the one or more entity terms.

19. The system of claim 11, wherein the first recurrent neural network, the second recurrent neural network, the third recurrent neural network, and the convolutional neural network are subnetworks of a network trained end-to-end on a training dataset, wherein the training dataset comprises a plurality of multimodal messages, each of the multimodal messages comprising an image and one or more terms corresponding to an entity.

20. A non-transitory machine-readable storage device embodying instructions that, when executed by a device, cause the device to perform operations comprising:

identifying a multimodal message comprising an image and a plurality of terms, the plurality of terms comprising an entity term and non-entity terms;

generating, using a convolutional neural network (CNN), an image representation from the image in the multimodal message;

generating, using a first recurrent neural network, a left representation from terms to the left of the entity term;

generating, using a second recurrent neural network, a target entity representation from the entity term;

generating, using a third recurrent neural network, a right representation from terms to the right of the entity term; and generating a sentiment classification by combining the image representation, the left representation, the target entity representation, and the right representation.

* * * * *

UNITED STATES PATENT AND TRADEMARK OFFICE
CERTIFICATE OF CORRECTION

PATENT NO. : 11,853,399 B2  
APPLICATION NO. : 18/059928  
DATED : December 26, 2023  
INVENTOR(S) : Yu et al.

Page 1 of 1

It is certified that error appears in the above-identified patent and that said Letters Patent is hereby corrected as shown below:

In the Claims

In Column 24, Line 32, in Claim 3, after "following:", insert a linebreak

In Column 24, Line 43, in Claim 6, after "and", insert a linebreak

In Column 25, Line 29, in Claim 13, after "following:", insert a linebreak

In Column 26, Line 7, in Claim 17, after "wherein", delete "the"

Signed and Sealed this  
Twenty-fifth Day of February, 2025

Coke Morgan Stewart  
*Acting Director of the United States Patent and Trademark Office*